US008819701B2

(12) United States Patent
Wheeler et al.

(10) Patent No.: US 8,819,701 B2
(45) Date of Patent: Aug. 26, 2014

(54) CLOUD COMPUTING MONITORING AND MANAGEMENT SYSTEM

(75) Inventors: Bradley Wheeler, Snohomish, WA (US); Bryan Griffin, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 464 days.

(21) Appl. No.: 12/636,712

(22) Filed: Dec. 12, 2009

(65) Prior Publication Data

US 2011/0145836 A1 Jun. 16, 2011

(51) Int. Cl.

| G06F 3/00 | (2006.01) |
|---|---|
| G06F 9/44 | (2006.01) |
| G06F 9/46 | (2006.01) |
| G06F 13/00 | (2006.01) |
| G06F 9/54 | (2006.01) |

(52) U.S. Cl.
CPC ............... *G06F 9/542* (2013.01); *G06F 9/546* (2013.01)
USPC ....................................................... 719/314

(58) Field of Classification Search
None
See application file for complete search history.

(56) References Cited

U.S. PATENT DOCUMENTS

| 6,018,343 | A  | * | 1/2000  | Wang et al. ................... 715/733 |
|---|---|---|---|---|
| 6,359,895 | B1 | * | 3/2002  | Yamanaka .................... 370/408 |
| 7,127,507 | B1 | * | 10/2006 | Clark et al. ................... 709/224 |
| 7,197,561 | B1 |   | 3/2007  | Lovy et al. |
| 7,617,309 | B2 |   | 11/2009 | Yoshida et al. |
| 7,826,376 | B1 | * | 11/2010 | Kritov et al. ................. 370/241 |
| 8,069,237 | B2 |   | 11/2011 | Yoshida et al. |
| 2003/0135613 | A1 |   | 7/2003  | Yoshida et al. |
| 2004/0122936 | A1 | * | 6/2004  | Mizelle et al. ................ 709/224 |
| 2006/0146711 | A1 | * | 7/2006  | Anbarani ...................... 370/235 |
| 2007/0118841 | A1 |   | 5/2007  | Driver et al. |
| 2007/0204007 | A1 |   | 8/2007  | Ashaari et al. |
| 2008/0201701 | A1 | * | 8/2008  | Hofhansl et al. .............. 717/168 |
| 2008/0215726 | A1 | * | 9/2008  | Sullivan ........................ 709/224 |
| 2008/0319984 | A1 | * | 12/2008 | Proscia et al. .................... 707/5 |
| 2009/0055838 | A1 |   | 2/2009  | Sedukhin et al. |
| 2009/0063613 | A1 | * | 3/2009  | Chijiiwa et al. .............. 709/202 |
| 2009/0254572 | A1 | * | 10/2009 | Redlich et al. ................. 707/10 |

(Continued)

FOREIGN PATENT DOCUMENTS

| CN | 101272288 A | 9/2008 |
|---|---|---|
| JP | 2009-211611 A | 9/2009 |

OTHER PUBLICATIONS

Urqhart James, "Cloud Computing and the Big Rethink: Part 5 ", Retrieved at<<http://news.cnet.com/wisdom-of-clouds/?categoryId=10093856>>, Oct. 19, 2009 , pp. 1-18.

(Continued)

*Primary Examiner* — H S Sough
*Assistant Examiner* — William C Wood
(74) *Attorney, Agent, or Firm* — Louise Bowman; Jim Ross; Micky Minhas

(57) ABSTRACT

A cloud computing monitoring system has an alert capturing system and a message transfer system that provides performance tracking and alert management to a local monitoring system. The alert capturing system may operate as part of a managed code framework and may capture and route alerts that may be transmitted to an operating system, as well as application exceptions and debugging information. A message queuing system may transmit the alerts to a local monitoring system, which may have a connector that subscribes to the cloud system's message queuing system.

20 Claims, 3 Drawing Sheets

(56) References Cited

U.S. PATENT DOCUMENTS

| | | | |
|---|---|---|---|
| 2009/0300149 A1 | 12/2009 | Ferris et al. | |
| 2009/0300601 A1* | 12/2009 | Faus et al. | 717/176 |
| 2009/0300604 A1* | 12/2009 | Barringer | 717/178 |
| 2009/0300635 A1 | 12/2009 | Ferris | |
| 2010/0023612 A1 | 1/2010 | Yoshida et al. | |
| 2011/0131499 A1* | 6/2011 | Ferris et al. | 715/736 |

OTHER PUBLICATIONS

Panettieri, Joe, "Nimsoft Launches Unified Dashboard for On-Premise, Cloud Monitoring", Retrieved at<<http://www.mspmentor.net/2009/10/20/nimsoft-launches-unified-dashboard-for-on-premise-cloud-monitoring/>>, Oct. 20, 2009, pp. 1-7.

Joseph, Joshy"Patterns for High Availability, Scalability, and Computing Power with Windows Azure", Retrieved at<<http://msdn.microsoft.com/en-us/magazine/dd727504.aspx>>, Oct. 23, 2009, pp. 1-9.

"3Tera and Tap in Systems Partner to Bring Enterprise Level Monitoring to the Cloud", Retrieved at<<http://www.thefreelibrary.com/3Tera+and+Tap+In+Systems+Partner+To+Bring+Enterprise+Level+Monitoring...-a0199060620, May 5, 2009, pp. 1-3.

"Finjan Cloud Security Solutions Extend On-Premise Unified Web Security into the Cloud", Retrieved at<<http://www.securitypark.co.uk/security_article263831.html>>, Oct. 30, 2009, pp. 1-3.

"International search report", Mailed Date: Jul. 18, 2011, Application No. PCT/US2010/055739 , Filed Date: Nov. 5, 2010, pp. 8.

Tap in Systems, Inc., "Tap in System Data Sheets: System Management in the Cloud", 2008, Retrieved at <<http://www.tapinsystems.com/downloads/TapIn_Cloud_Management_Service_Datasheet.pdf>> on Oct. 23, 2009, pp. 1-2.

Extended European Search Report from the European Patent Office regarding Application No. 10836385.4 dated Jan. 3, 2014, 8 pages.

Shao et al., "A Runtime Model Based Monitoring Approach for Cloud", 2010 IEEE 3rd International Conference on Cloud Computing, Jul. 5, 2010, 8 pages.

Office Action from the State Intellectual Property Office of the People's Republic of China regarding Application No. 201080055878.5 dated Feb. 21, 2014, 14 pages.

Office Action from the Japan Patent Office regarding Application No. 2012-543114 dated Apr. 30, 2014, 10 pages.

Ricknas, "Tap In Systems Monitors and Runs in the Cloud", Business Software, Retrieved at <<http://www.pcworld.com/article/163534/article.html>>, Apr. 21, 2009, 3 pages.

Nikkei BP, "Virtual Network in Windows Azure", Nikkei Network, No. 114, pp. 62-65, Sep. 28, 2009, 6 pages.

Maruyama, "Cloud Computing: The Forming Process of the Cloud and its Technical Features", Information Processing Society of Japan (IPSJ), vol. 50, No. 11, pp. 1055-1061, Nov. 15, 2009, 7 pages.

Tap In Systems, Inc., "Amazon CloudWatch", Retrieved at <<http://www.praesentia.co.jp/business/tapinsystems/ how-it-works/amazon-cloudwatch/>> Jun. 2009, 3 pages.

* cited by examiner

CLOUD COMPUTING MONITORING AND MANAGEMENT SYSTEM

BACKGROUND

Cloud computing is a computing paradigm that abstracts many aspects of a conventional computer. In a cloud environment, the hardware components may be abstracted into a hardware fabric. The hardware fabric may be many server computers located in one or more datacenters, and the datacenters may be geographically dispersed.

In many cloud environments, the conventional notion of an operating system may also be abstracted so that applications may operate in a runtime environment, but with limited access to operating system functions.

The cloud environment may execute applications in a manner that is highly scalable. A developer may provide an application to execute, and a management system may determine how much computing resources to allocate, the geographic location of those resources, and may determine which hardware platforms on which to execute the application. In some cases, an administrator may be able to determine some upper and lower limits to the computing resources, but the cloud management system may handle allocating the specific resources and managing the execution of the application.

Cloud environments may allow applications to scale up and down with load, as the cloud management system may allocate resources during high load periods and free up resources during low loads.

SUMMARY

A cloud computing monitoring system has an event capturing system and a message transfer system that provides performance tracking and alert management to a local monitoring system. The event capturing system may operate as part of a managed code framework and may capture and route alerts that may be transmitted to a monitoring system, as well as application exceptions and debugging information. A message queuing system may transmit the events to a local monitoring system, which may have a connector that subscribes to the cloud system's message queuing system. The monitoring system may be a framework or executable code library that can be linked to and called by the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
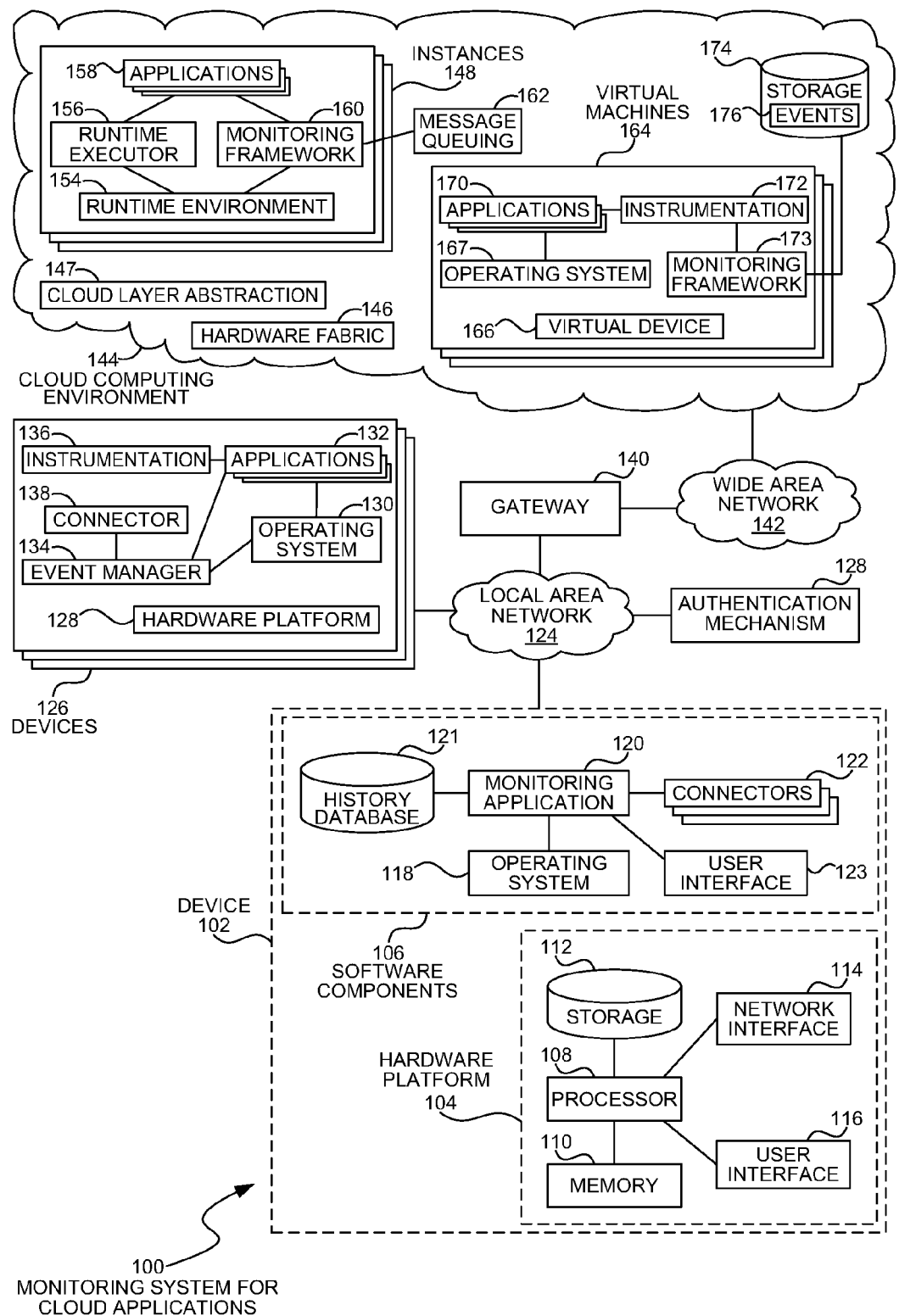
FIG. 1 is a diagram illustration of an embodiment showing a network environment in which a monitoring system may operate with a cloud computing environment.

A cloud computing runtime environment may have a monitoring framework that includes executable routines for capturing and reporting errors, debugging information, performance information, status, and other information that may be transferred to a centralized monitoring application. The centralized monitoring application may collect information from multiple executing applications to provide alerting and management functions to administrators. In some embodiments, the monitoring application may be used in a network operations center for real time network and applications monitoring.

The monitoring framework may include functions for capturing information from an application and communicating that information to a monitoring application. The monitoring framework may receive the information to transmit, prepare messages from the information, and transmit those messages to the monitoring system in a format that the monitoring system may consume. In some embodiments, a message queuing system may be used to transmit the messages to a monitoring system that has a connector or other mechanism by which the monitoring system may subscribe to the message queue.

The monitoring framework may be included in a runtime environment for a cloud computing environment in some embodiments. The runtime environment may be a managed code environment that may include real time linking, garbage collection, and other services. In some embodiments, the monitoring framework may be included in a software development kit or other predefined set of executables against which an application may be developed, tested, and deployed in a cloud environment.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a cloud environment with a monitoring system. Embodiment 100 is a simplified example of a device with a monitoring system that may work in conjunction with applications in a cloud computing environment, where the cloud applications may use a monitoring framework to capture and transmit messages consumed by the monitoring application.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a monitoring system that may monitor cloud applications. The monitoring system may monitor many different devices, applications, and other components, then consolidate the status of the components into a user interface. The monitoring system may be used to monitor the health and status of an enterprise's information technology infrastructure in a centralized manner.

The information infrastructure may include many different servers, services, applications, and other components. Some of the components may be local or on premise components, such as applications executing on the monitoring device as well as applications executing on devices within a local area network. Other components may be remote components, such as cloud applications.

Cloud computing environments have different variations. In one type of cloud computing environment, a virtual machine may be created and executed on a remote hardware fabric. The virtual machine may have an operating system or other function that may be configured and instrumented to interface with a monitoring system.

In another type of cloud computing environment, a hardware fabric may have multiple server devices that each have an operating system, and each may also have a cloud layer operating on top of the operating systems. The cloud layer may abstract the operating system from the application, and provide many automated management functions. The cloud layer may provide load balancing, redundancy, replication in different geographic areas, resource management, and other functions. In many implementations, the cloud layer may automatically manage the resources used to execute a cloud application.

Many cloud computing environments may implement a monitoring framework. A monitoring framework may be a set of functions that can be called by an application to capture information and transmit the information to a monitoring system. The monitoring framework may create messages that encapsulate the information to be transmitted, where the messages are compatible with a monitoring system both in format and delivery.

A device 102 may be used to monitor various components, including applications executed in a cloud environment. The device 102 may have a hardware platform 104 and various software components 106. The device 102 is illustrated as a standalone device on which a monitoring application may operate.

The hardware platform 104 may by a typical computing platform, such as a server or desktop computer. The hardware platform 104 may include a processor 108, random access memory 110, and nonvolatile storage 112. The hardware platform 104 may also include a network interface 114 as well as a user interface 116.

In many embodiments, the hardware platform 104 may be a server computer, but in other embodiments, the hardware platform 104 may be any type of computing device. For example, the hardware platform 104 may be a server computer, desktop computer, laptop computer, netbook computer, or other device. In some cases, the hardware platform 104 may be a mobile device, such as a personal digital assistant, portable computer, mobile telephone, or other mobile device.

The software components 106 may include an operating system 118 on which a monitoring application 120 may execute. The monitoring application 120 may have several connectors 122 that may gather information from specific devices, applications, or other monitored components.

The monitoring application 120 may gather information from other components and aggregate the information into a user interface. In one use scenario, the monitoring application 120 may be used to monitor the performance, configuration, and use of hardware and software components within a company or other enterprise. The monitoring application 120 may alert an administrator when problems may come up on any of the monitored components, as well as give a status of the components. In many embodiments, the monitoring application 120 may provide real time or near-real time updates and status of the monitored components.

In some embodiments, the monitoring application 120 may have a user interface 123 in which the status of the monitored components and any alerts may be presented. The monitoring application 120 may use a messaging system to transmit alerts or other messages to various recipients using email, voicemail, or other mechanisms. The alerts may be emergency messages, for example, that may be transmitted when an urgent event may be detected.

The monitoring application 120 may have several connectors 122. The connectors 122 may connect with various information sources to collect and gather information about monitored components. The information sources may be any application, function, device, or other component that may generate alerts, events, performance data, or other information that may be consumed by a monitoring application 120. The connectors 122 may be active functions that may request information from a source as well as passive functions that may receive information on a periodic basis or when the information is available.

An active connector 122 may periodically initiate data collection. In some embodiments, a connector 122 may transmit a request for information to a service that may return the information requested. In another embodiment, a connector 122 may contact a remote data storage device and download or retrieve data stored on the storage device.

A passive connector 122 may receive a transmission that may be initiated by another device or service. The other device or service may transmit messages or other forms of information to the connector 122 on a periodic basis or when there is information to transmit.

Some connectors 122 may subscribe to a message queue to receive information updates. A connector 122 may initiate a subscription by contacting a queuing system or other messaging system using a Uniform Resource Identifier (URI) or other identifier or address. In some embodiments, such a connector 122 may present credentials to the messaging system to be able to receive messages.

Some messaging systems may create several subscriptions to which one or more monitoring systems may subscribe. For example, a cloud application may have several subscriptions available, such as one for high priority alerts, another one for operational status, and another one for debugging information. In some cases, the monitoring application 120 may subscribe to one or more of the available subscriptions.

The monitoring application 120 may gather many different types of information from a monitored component. The information may include general status information, performance information, alerts and emergency status, debugging information, and other information. Some embodiments may have different mechanisms for handling different types of information, including different manners for gathering, storing, processing, and presenting the information.

Status information may indicate the current operational state of a component. The status information may be updated when a component may be started, paused, stopped, or have other state changes. In many cases, the status information may be provided on a real time or near-real time basis. The status information may be used to present high level overview of the various monitored components. For example, a dashboard view of a set of monitored applications may be presented with green icons for operational status and red icons for stopped or paused status. A single user interface may provide a current status for many different monitored components in an easy to scan user interface.

Performance information may include various summary or detailed statistics about the operation of a component. For a monitored hardware component, performance information may include processor usage, disk capacity, network activity, memory usage, and other information. For a monitored software application, performance information may include number of requests processed, amount of data transmitted, or other performance metrics. The type of performance information may differ with different types of applications. Some performance information may be real time information that may be transmitted and displayed in a time sensitive manner. Other performance information may be historical information that may be transmitted to the monitoring application 120 on a delayed basis.

The performance information may be summary statistics as well as detailed information used to generate the summary statistics. Some embodiments may transmit summary statistics in different manner than the detailed information. For example, the summary statistics may be updated frequently using a message notification system that pushes the summary statistics to the monitoring application 120 while the detailed information may be stored in a remote database and pulled by the monitoring application 120 when the information may be requested.

In some embodiments, the summary statistics may be generated by a monitoring framework from the detailed performance information. In other embodiments, the detailed performance information may be transmitted to the monitoring application 120 and the summary statistics may be generated by the monitoring application 120.

Alert and emergency information may include high priority messages that may be used to identify actions that may be taken. For example, an alert may be generated when the available storage space has decreased to a very low limit, or when a terminal error has occurred with an application. In some embodiments, alerts may be processed by the monitoring application 120 and transmitted to an administrator using email, voicemail, or other mechanism.

Debugging information may be information that may be used by a developer to track down and solve problems. Debugging information may be very detailed and very voluminous. For example, debugging information may include indicators when a function is called along with parameters that are passed into or out of the function.

In some embodiments, the information transmitted to the monitoring system 120 may be defined by both policies and configuration settings. A policy may be a high level definition of the information that may be collected and transmitted. Some embodiments may have hierarchical policies where child policies inherit properties from parent policies. Configuration settings may include specific parameters, algorithms, or conditions that may be adjusted to determine which information to collect and transmit. Some embodiments may have other mechanisms for defining the information that may be collected and transmitted.

The monitoring application 120 may store the collected information in a history database 121. The history database 121 may contain information that was collected over a period of time. In some embodiments, the history database 121 may be used to generate summary statistics that may be displayed on the user interface 123, as well as detailed data that a user may display by drilling down into the information.

The monitoring application 120 may collect information from many different sources. The device 102 may be connected to a local area network 124 and to several devices 126 connected to the local area network 124. The devices 126 may have sources for information collected, managed, and displayed by the monitoring application 120.

The devices 126 may have a hardware platform 128, as well as an operating system 130 and various applications 132. The hardware platform 128 may be similar to the hardware platform 104 of device 102, and the devices 126 may be server computers, desktop computers, laptop computer, personal digital assistants, cellular telephones, network appliance, or any other computing device.

The applications 132 may have instrumentation 136 that may identify information to collect and cause the information to be stored in an event manager 134. The event manager 134 may be an application or operating system level function that collects various events that occur in the operating system 130 or applications 132 for administrative or other uses. A connector 138 may communicate with the connectors 122 to communicate information collected by the event manager 134 and transmit the information to the monitoring application 120.

The instrumentation 136 may be functions that are added to or called by the applications 132 to collect information. The instrumentation 136 may be routines that gather debugging information, performance information, status information, or other information. In some cases, the instrumentation 136 may monitor an application or operating system function to gather status, performance, and other information without being called directly by the application or operating system function.

A cloud computing environment 144 may also be monitored by the monitoring application. The device 102 may be connected to a local area network 124 to a gateway 140 to a wide area network 142. The wide area network 142 may be the Internet, for example. The cloud computing environment 144 may be connected to the Internet or wide area network 142.

The cloud computing environment 144 may have a hardware fabric 146 that is abstracted from a user, developer, or administrator. In many cases, a hardware fabric 146 may be a large datacenter or a group of large datacenters that may contain many hundreds, thousands, or even hundreds of thousands of computing devices. Many datacenters have redundant power sources, redundant network connections, and many failover mechanisms so that very high availability and very high uptimes are achieved.

The cloud computing environment 144 may include internal management systems that perform load balancing, clustering, and other functions that allow capacity to be allocated or de-allocated to certain processes or functions. In many cases, a cloud computing environment 144 may move certain processes or functions to specific geographical regions, transfer processes from one data center to another, move processes from one hardware platform to another, or perform other allocation processes without interaction with end users, developers, or administrators.

Some cloud computing environments may be shared environments, where a datacenter operator may offer cloud computing infrastructure for executing applications from many different customers. Each customer may have an application that is executed for that customer and is managed by the customer. Even though the application is managed by the customer, the underlying datacenter operations may be managed by the datacenter operator. The customer may use a monitoring framework to gather performance, status, debugging, and other information about their application separately from the monitoring and management operations that may be performed by the datacenter operator.

The cloud computing environment 144 may have a cloud layer abstraction 147 that may abstract instances 148 having a runtime environment 154. The cloud layer abstraction 147 may be a software layer that joins multiple hardware devices into a system where applications may be executed without the conventional notion of an operating system.

The runtime environment 154 may execute applications 158 using a runtime executor 156. The runtime executor 156 may perform linking and execution control of the applications 158, and the runtime environment 154 may provide additional management functions such as garbage collection, compilation, and other functions.

A monitoring framework 160 may be linked into and called by the applications 158. The monitoring framework 160 may be a set of functions that collect, process, and transmit information from the applications to a monitoring application 120.

In some embodiments, the monitoring framework 160 may use a message queuing system 162 to transmit information to the monitoring application 120. A message queuing system 162 may collect messages from various sources and make the messages available to a subscriber. In some aspects, the message queuing system 162 may operate like an email or other message system where the messages may be gathered together in a queue that can be accessed when the recipient is ready to receive the messages.

The message queuing system 162 may have a subscription service by which a recipient may receive messages. An intended recipient may contact the message queuing system 162 to receive messages, and the messages may be pushed to the recipient or pulled by the recipient. In the case of the monitoring application 120, a connector 122 may be configured to subscribe to a message queue and communicate with the message queuing system 162 to receive information.

Some message queuing systems may allow one and only one subscriber to a particular message queue. Other message queuing systems may permit multiple subscribers to a single queue.

In many embodiments, a cloud computing environment may have multiple instances 148 operating on many different physical machines and sometimes in many different datacenters that may be geographically dispersed around the globe. In such embodiments, a message queuing system 162 may act as a central repository for any messages created by the various instances and allow a monitoring application 120 to monitor all of the various instances of the application 158 as a single group or unit.

In some embodiments, a subscriber may present credentials or may otherwise be authenticated to the message queuing system 162. The authentication may be performed in many different manners. In some cases, a connector 122 may obtain an authenticated token from an authentication mechanism 178 and present the authenticated token to the message queuing system 162 to subscribe.

Some cloud computing environments 144 may use a virtual machine paradigm. Virtual machines 164 may have a virtual device 166 that may execute an operating system 167. Various applications 170 may execute within the operating system 167.

The virtual machine paradigm illustrated by the virtual machines 164 is different from the cloud layer abstraction of the instances 148 in that the operating system 167 may be exposed to, selectable by, and managed by the developer or administrator of the various applications. In the case of the instances 148, the operating system may not be accessed by the developer or administrator of the applications 158, but in the case of the virtual machines 164, the operating system 167 may be accessed by the developers or administrators of the applications 170.

The applications 170 may have instrumentation 172 and may access the monitoring framework 173. In some embodiments, the monitoring framework 173 may be the same as monitoring framework 160.

The monitoring framework 173 is illustrated as outputting information to a storage 174 in which various events 176 may be stored. The storage 174 may store information that may be pulled by a connector 122. The connector 122 may access the storage 174 to download the events 176 that may contain the information generated by the monitoring framework 173

The storage 174 may illustrate a different transmission mechanism than the message queuing system 162. The message queuing system 162 may illustrate a mechanism by which information may be transmitted to a connector 122 using messages. In many such systems, a message queuing system 162 may have many features that may facilitate communication and security. These may include authentication, encryption, message storage, and other features. The transmission mechanisms of the message queuing system 162 may be a push type transmission where the message queuing system 162 may transmit messages to the connector 122 when the messages are available. Some message queuing systems may allow the connector 122 to request messages and may act as a pull type transmission. The storage 174 may be pull type transmission where a connector 122 may contact the storage 174 to retrieve the events 176.

In some embodiments, a monitoring framework may use both a message queuing system and a storage mechanism for transmitting information. In some such embodiments, certain classifications or types of data may be transmitted using one mechanism while other types of data may be transmitted using the other. For example, a monitoring framework may transmit alerts and emergency messages using a message queuing system but may transmit debugging information using a storage mechanism.

Figure 2:
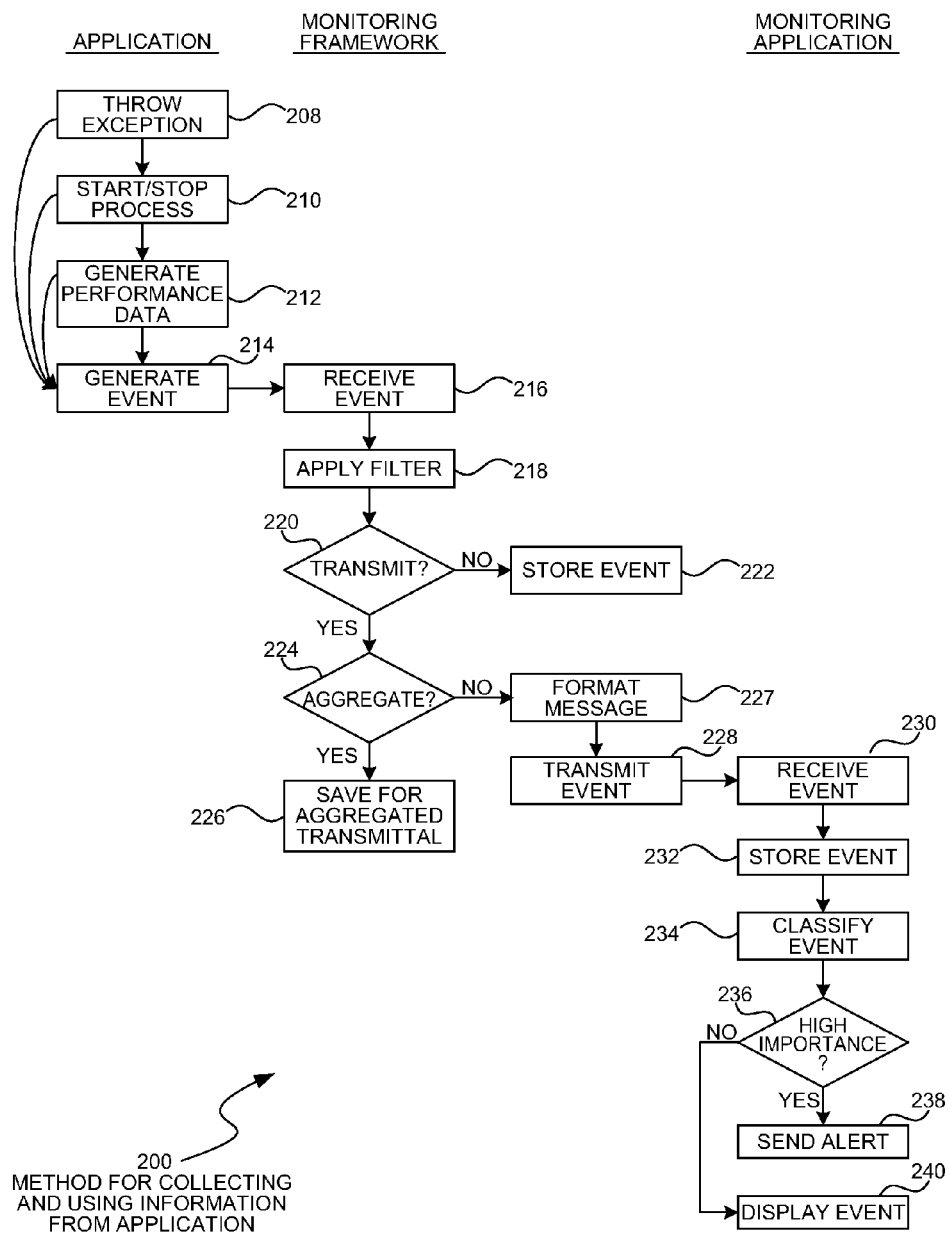
FIG. 2 is a timeline illustration of an embodiment showing a method of capturing, transmitting, and using monitored events.

FIG. 2 is a timeline illustration of an embodiment 200 showing a method for generating, transmitting, and using information produced by an application. Embodiment 200 illustrates the operations that may be performed by an application 202 in the left hand column, a monitoring framework 204 in the center column, and a monitoring application 206 in the right hand column. Embodiment 200 may illustrate some of the functions performed by applications 158 or 170, the monitoring frameworks 160 or 173, and the monitoring application 120 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The application 202 may generate information in many different manners. For example, the application 202 may throw an exception in block 208, start or stop a process in block 210, or generate performance data in block 212. Other examples may include generating debugging information, capturing a data value, or encountering a predefined condition. The information generated by an application 202 may be created within the application itself or as part of an instrumentation framework that may be linked to and called from the application executable.

Any of the information generated in blocks 208-212 may be used to generate an event in block 214. The event of block 214 may be the information that may be transmitted by the application 202 and may be consumed by the monitoring application 206. The event may be transmitted by the application 202 and received by the monitoring framework 204 in block 216.

The monitoring framework 204 may perform some processing to the event prior to transmitting the event to the monitoring application 206. The processing may include filtering the event in block 218 as well as aggregating the event.

The filtering in block 218 may classify the event and determine how the event may be handled based on the classification. For example, some events may be identified as high priority events and may be expedited to the monitoring application 206, while other events may be ignored based on a policy or configuration setting and not transferred at all.

If the event is not to be transmitted in block 220, the event may be stored in block 222. In some embodiments, the event may be stored in a data storage system so that the monitoring application 206 may pull the information from the data storage system at a later time. In some situations, the event may be discarded.

If the event is to be transmitted in block 220 and not aggregated in block 224, a message may be formatted in block 227 and the event may be transmitted in block 228.

If the event is to be aggregated in block 224, the event may be stored with other events for an aggregated transmission in block 226. An aggregated transmission may be performed in several manners. In one case, a set of events may be consolidated into a single message for transmission. Such events may be repeated instances of the same event or may be a group of similar or even unrelated events. In another case, an event that recurs multiple times may be consolidated into a single event that includes a count of the number of times the even occurred. For example, a known error event may be aggregated so that a single message may be transmitted after 100 occurrences of the event have been received. This version of the claims will replace all prior versions of the claims in the application.

The monitoring application 206 may receive the event in block 230. Various mechanisms may be used to transmit the event in block 228 and receive the event in block 230. Such mechanisms include mechanisms that push events from the monitoring framework 204 to the monitoring application 206, as well as mechanisms that pull events from the monitoring framework 204 to the monitoring application 206. The mechanisms may include message queuing systems, data storage systems, and other communication mechanisms.

After receiving the event in block 230, the event may be stored in block 232. The event may be classified in block 234 and if the event is a high importance event in block 236, an alert may be sent in block 238. If the event is not a high importance event in block 236, the event may be displayed in block 240.

Figure 3:
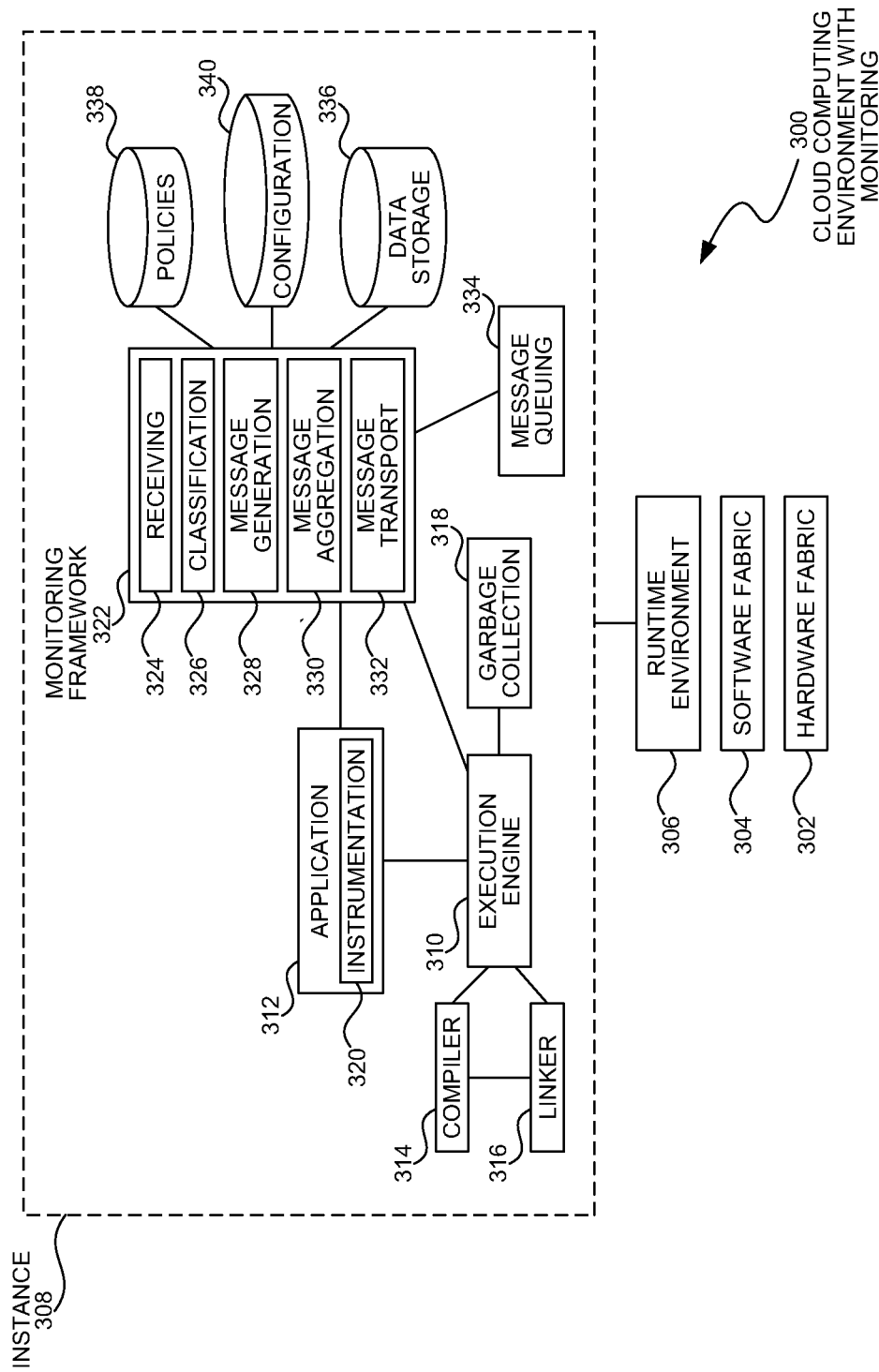
FIG. 3 is a diagram illustration of an embodiment showing a cloud computing environment with a monitoring framework.

FIG. 3 is a diagram of an embodiment 300, showing a cloud environment with a monitoring system. Embodiment 300 is a simplified example of a runtime instance that may execute applications with a monitoring framework.

The diagram of FIG. 3 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 300 is an example of a system that may operate as a cloud computing environment. A hardware fabric 302 may operate a software fabric 304 that provides an abstracted cloud computing layer. The cloud computing layer may include a runtime environment 306 that may have multiple instances, such as the instances 148 illustrated in embodiment 100.

The runtime environment 306 may include an execution engine 310 that may execute the application 312 as managed code. In some embodiments, a compiler 314 may compile the application 312 from source code or intermediate code into executable code. A linker 316 may link various frameworks, dynamic linked libraries, or other code elements to the application 312. Some embodiments may have the application 312 defined in an interpreted language.

The runtime environment 306 may include various managed code capabilities, such as dynamic linking, garbage collection 318, memory management, resource management, error capturing, and other features.

The application 312 may include instrumentation 320 that may identify and capture certain conditions, data, errors, performance metrics, or other events or information. The instrumentation 320 may call a monitoring framework 322 that may contain several functions. The monitoring framework 322 may process the information received from the application 312 and prepare the information to be transmitted to a monitoring system.

The monitoring framework 322 may have a receiving function 324 that may receive information from the application 312. The receiving function 324 may perform initial processing of the information, such as placing the received information into a format that may be used by the monitoring framework 322 for other functions as well as a format that may be used by a monitoring application. In some embodiments, the receiving function 324 may perform some handshaking with the application 312.

The receiving function 324 may gather other information in addition to the information received from the application 312. For example, the receiving function 324 may receive an error condition from the application 312. The receiving function 324 may gather other data, such as a timestamp, the values of some configuration settings, values of certain variables, or other information. The receiving function 324 may aggregate and organize the information into a format that may be used by other functions in the monitoring framework 322.

In some embodiments, the configuration settings 340 may indicate that the application 312 is operated in a debugging mode. A debugging mode may define a high level of debugging information that may be captured by the monitoring framework 322. In some cases, the debugging mode may be a setting used by the monitoring framework 322 to capture a higher level of detail. In other cases, the application 312 may be executed in a debugging mode so that the application 312 generates a larger quantity of events or with a higher level of detail than a normal operation.

A classification function 326 may be part of the monitoring framework 322 and may operate to classify the event. The classification may be used in conjunction with policies 338 and configuration settings 340 to determine how the event may be handled. Some events may be transmitted with high priority, while other events may be aggregated or even discarded.

A message generation function 328 may format the event and other information into a message that may be transported using a message queuing system 334 or stored in a data storage system 336.

A message aggregation function 330 may consolidate messages together into a single message. In some cases, multiple instances of a single message may be consolidated into a single message. In other cases, different messages may be grouped together into a single message.

A message transport function 332 may cause the message to be transported from the monitoring framework 322 to a monitoring application. The message transport function 332 may use the message queuing system 334, data storage system 336, or other mechanism to transport the message.

In some embodiments, the monitoring framework 322 may be the same or similar to a monitoring framework that may be used for application development. When used for application development, the monitoring framework 322 may be incorporated into a local application development platform and compiled and linked with the application. The application may be executed on a local device in debug or development mode so that a developer may test and refine the application. Once the application is ready to be deployed on the cloud, the application may be uploaded to the cloud and compiled and linked with the monitoring framework in the cloud.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A computing system comprising:

one or more computing devices of a hardware fabric configured to provide a cloud computing environment for executing a cloud application uploaded to the cloud computing environment by a customer;

a monitoring framework implemented within the cloud computing environment and linked to the cloud application; and a message queuing system implemented within the cloud computing environment and used by the monitoring framework to communicate with a remote monitoring application that is operating on a computing device located within an information infrastructure of an enterprise, wherein:

the monitoring framework is configured to collect performance information generated by the cloud application and provide the performance information to the message queuing system within the cloud computing environment;

the message queuing system is configured to provide a subscription service for a plurality of message queues, encapsulate the performance information in a message that is compatible with the remote monitoring application operating on the computing device located within the information infrastructure of the enterprise, and store the message encapsulating the performance information in a particular message queue associated with the remote monitoring application;

the remote monitoring application is configured to subscribe to the particular message queue and retrieve the message encapsulating the performance information from the particular message queue within the cloud computing environment over a wide area network; and the remote monitoring application is further configured to aggregate the performance information from the retrieved message with other performance information collected by the monitoring application from on-premise components that are located within the information infrastructure of the enterprise and monitored by the remote monitoring application.

2. The computing system of claim 1, wherein the remote monitoring application presents an authentication token to subscribe to the message queue.

3. The computing system of claim 1, wherein the monitoring framework is included in a runtime environment for the cloud computing environment.

4. The computing system of claim 1, wherein the monitoring framework is dynamically linked to and called by the cloud application.

5. The computing system of claim 1, wherein:
the monitoring framework within the cloud computing environment is a runtime version of the monitoring framework, and
the cloud application is uploaded from a development platform that includes a development version of the monitoring framework.

6. The computing system of claim 1, wherein:
the monitoring framework is configured to collect and store exceptions thrown by the cloud application; and
the remote monitoring application is configured to generate alerts for the exceptions thrown by the cloud application.

7. The computing system of claim 1, wherein the monitoring framework is configured to collect and store debugging information generated when the cloud application is operated in a debugging mode.

8. The computing system of claim 1, wherein:
the cloud computing environment includes multiple instances of the cloud application; and
the monitoring framework is configured to aggregate performance information generated by the multiple instances of the cloud application.

9. A method comprising:
providing, by one or more computing devices of a hardware fabric, a cloud computing environment for executing a cloud application uploaded to the cloud computing environment by a customer;
implementing a monitoring framework within the cloud computing environment;
linking the monitoring framework to the cloud application within the cloud computing environment;
implementing a message queuing system within the cloud computing environment, wherein the message queuing system is used by the monitoring framework to communicate with a remote monitoring application that is operating on a computing device located within an information infrastructure of an enterprise;
collecting, by the monitoring framework, performance information generated by the cloud application;
providing, by the monitoring framework, the performance information to the message queuing system within the cloud computing environment;
providing, by the message queuing system, a subscription service for a plurality of message queues;
encapsulating, by the message queuing system, the performance information in a message that is compatible with the remote monitoring application operating on the computing device located within the information infrastructure of the enterprise; and
storing, by the message queuing system, the message encapsulating the performance information in a particular message queue associated with the remote monitoring application, wherein:
the remote monitoring application is configured to subscribe to the particular message queue and retrieve the message encapsulating the performance information from the particular message queue within the cloud computing environment over a wide area network; and
the remote monitoring application is further configured to aggregate the performance information from the retrieved message with other performance information collected by the monitoring application from on-premise components that are located within the information infrastructure of the enterprise and monitored by the remote monitoring application.

10. The method of claim 9, wherein the monitoring framework is included in a runtime environment for the cloud computing environment.

11. The method of claim 9, further comprising:
authenticating, by the message queuing system, a subscription request from the remote monitoring application, the subscription request for subscribing to the particular message queue.

12. The method of claim 9, wherein:
the monitoring framework within the cloud computing environment is a runtime version of the monitoring framework, and
the cloud application is uploaded from a development platform that includes a development version of the monitoring framework.

13. The method of claim 9, wherein:
the monitoring framework is configured to collect and store exceptions thrown by the cloud application; and
the remote monitoring application is configured to generate alerts for the exceptions thrown by the cloud application.

14. The method of claim 9, wherein the monitoring framework is configured to collect and store debugging information generated when the cloud application is operated in a debugging mode.

15. The method of claim 9, wherein:
the cloud computing environment includes multiple instances of the cloud application; and
the monitoring framework is configured to aggregate performance information generated by the multiple instances of the cloud application.

16. A computer-readable storage device storing computer-executable instructions that, when executed by one or more computing devices of a hardware fabric, perform a method comprising:
providing, by the one or more computing devices of the hardware fabric, a cloud computing environment for executing a cloud application uploaded to the cloud computing environment by a customer;
implementing a monitoring framework within the cloud computing environment;
linking the monitoring framework to the cloud application within the cloud computing environment;
implementing a message queuing system within the cloud computing environment, wherein the message queuing system is used by the monitoring framework to communicate with a remote monitoring application that is operating on a computing device located within an information infrastructure of an enterprise;
collecting, by the monitoring framework, performance information generated by the cloud application;

providing, by the monitoring framework, the performance information to the message queuing system within the cloud computing environment;

providing, by the message queuing system, a subscription service for a plurality of message queues;

encapsulating, by the message queuing system, the performance information in a message that is compatible with the remote monitoring application operating on the computing device located within the information infrastructure of the enterprise; and storing, by the message queuing system, the message encapsulating the performance information in a particular message queue associated with the remote monitoring application, wherein:

the remote monitoring application is configured to subscribe to the particular message queue and retrieve the message encapsulating the performance information from the particular message queue within the cloud computing environment over a wide area network; and the remote monitoring application is further configured to aggregate the performance information from the retrieved message with other performance information collected by the monitoring application from on-premise components that are located within the information infrastructure of the enterprise and monitored by the remote monitoring application.

17. The computer-readable storage device of claim 16, wherein:

the cloud computing environment includes multiple instances of the cloud application; and the monitoring framework is configured to aggregate performance information generated by the multiple instances of the cloud application.

18. The computer-readable storage device of claim 16, wherein:

the monitoring framework within the cloud computing environment is a runtime version of the monitoring framework, and the cloud application is uploaded from a development platform that includes a development version of the monitoring framework.

19. The computer-readable storage device of claim 16, wherein:

the monitoring framework is configured to collect and store exceptions thrown by the cloud application; and the remote monitoring application is configured to generate alerts for the exceptions thrown by the cloud application.

20. The computer-readable storage device of claim 16, wherein the monitoring framework is configured to collect and store debugging information generated when the cloud application is operated in a debugging mode.

* * * * *